(12) United States Patent
Rüdiger et al.

(10) Patent No.: US 7,582,720 B2
(45) Date of Patent: Sep. 1, 2009

(54) LIGHT-SCATTERING SHAPED ARTICLES OF HIGH LIGHT TRANSMISSION AND THE USE THEREOF IN FLAT SCREENS

(75) Inventors: Claus Rüdiger, Krefeld (DE); Michael Prein, Krefeld (DE); Marco Roelofs, Krefeld (DE); Jürgen Röhner, Köln (DE); Tanja Grüter-Reetz, Krefeld (DE)

(73) Assignee: Bayer Material Science AG (DE)

( * ) Notice: Subject to any disclaimer, the term of this patent is extended or adjusted under 35 U.S.C. 154(b) by 213 days.

(21) Appl. No.: 11/361,485

(22) Filed: Feb. 24, 2006

(65) Prior Publication Data

US 2006/0198999 A1 Sep. 7, 2006

(30) Foreign Application Priority Data

Mar. 3, 2005 (DE) .................. 10 2005 009 653

(51) Int. Cl.
*C08G 64/00* (2006.01)
*C08G 63/02* (2006.01)

(52) U.S. Cl. .......... 528/196; 428/327; 428/156; 428/172; 428/357; 523/201; 528/198

(58) Field of Classification Search ............. 428/327, 428/156, 172, 357; 523/201; 528/196, 198
See application file for complete search history.

(56) References Cited

U.S. PATENT DOCUMENTS

| | | | |
|---|---|---|---|
| 6,046,335 A | 4/2000 | Boeglin et al. | 546/32 |
| 6,323,267 B1 | 11/2001 | Nesvadba et al. | 524/109 |
| 2004/0066645 A1 | 4/2004 | Graf et al. | 362/31 |

FOREIGN PATENT DOCUMENTS

| | | | |
|---|---|---|---|
| CA | 2127894 | | 1/1995 |
| CA | 2574887 A1 | | 2/2006 |
| EP | 0634445 | * | 1/1995 |
| EP | 1635196 A1 | | 3/2006 |
| JP | 3-78701 | | 4/1991 |
| JP | 5-257002 | | 10/1993 |
| JP | 8-220311 | | 8/1996 |
| JP | 9-311205 | | 12/1997 |
| JP | 10-46018 | | 2/1998 |
| JP | 10-46022 | | 2/1998 |
| JP | 2004-029091 | | 1/2004 |

* cited by examiner

*Primary Examiner*—Terressa M Boykin
(74) *Attorney, Agent, or Firm*—Connolly Bove Lodge & Hutz LLP

(57) ABSTRACT

The present invention relates to a solid sheet prepared from a composition that includes: (a) a transparent polycarbonate; and (b) transparent polymeric particles having an optical density which differs from the transparent polycarbonate matrix material. The present invention also relates to use of such a solid sheet as a diffuser sheet in flat screens.

8 Claims, No Drawings

LIGHT-SCATTERING SHAPED ARTICLES OF HIGH LIGHT TRANSMISSION AND THE USE THEREOF IN FLAT SCREENS

CROSS REFERENCE TO RELATED PATENT APPLICATION

The present patent application claims the right of priority under 35 U.S.C. §119 (a)-(d) of German Patent Application No. 10 2005 009 653 filed Mar. 3, 2005, which is incorporated herein by reference in its entirety.

FIELD OF THE INVENTION

The present invention relates to a solid sheet of a composition of a transparent polycarbonate and transparent polymeric particles having an optical density which differs from that of the matrix material, and to the use of such a solid sheet as a diffuser sheet in flat screens.

BACKGROUND OF THE INVENTION

Light-scattering translucent products of polycarbonate with various light-scattering additives and mouldings produced therefrom are already known from the prior art.

Thus, for example, EP-A 634 445 discloses light-scattering compositions which comprise polymeric particles based on vinyl/acrylate having a core/shell morphology in combination with $TiO_2$.

The use of light-scattering polycarbonate films in flat screens is described in US 2004/0066645. Polyacrylates, PMMA, polytetrafluoroethylenes, polyalkyl-trialkoxysilanes and mixtures of these components are mentioned here as light-scattering pigments.

JP 09311205 describes the use of PC/poly(4-methyl-1-pentene) blends as the matrix material for diffusers in backlight units.

JP 03078701 describes light-scattering PC sheets which contain calcium carbonate and titanium dioxide as scattering pigments and have a light transparency of approx. 40%.

JP 05257002 describes light-scattering PC sheets with scattering pigments of silica.

JP 10046022 describes PC sheets with scattering pigments of polyorganosiloxanes.

JP 08220311 describes two-layered sheets with a diffuser coextruded layer of 5 to 25 μm, which contains acrylic scattering pigments, and a base layer. The scattering pigments used here have a size of from 0.1 to 20 μm.

JP 10046018 claims a PC which contains 0.01 to 1% of crosslinked spherical polyacrylates.

JP 09011328 claims PC sheets which have a pronounced grooved structure which is applied during the extrusion.

JP 2004/029091 describes PC diffuser sheets which contain 0.3 to 20% of scattering pigment and 0.0005 to 0.1% of optical brightener.

DE-A 37 83 338 describes light-scattering polymer compositions containing a matrix polymer and particles of a core/shell polymer for the production of rear projection tv screens.

U.S. Pat. No. 6,346,311 describes light-transmissive polymer compositions containing a matrix polymer and mixtures of spheroidal and ellipsoidal particles for the production of rear projection screens.

WO 04/031285 (corresponding to DE-A 102 45 705, not pre-published) describes polymer compositions containing various optical brighteners.

However, the diffuser sheets known from the prior art have an unsatisfactory brightness, in particular in conjunction with the set of films conventionally used in a so-called backlight unit. To evaluate the suitability of the light-scattering sheets for so-called backlight units for LCD flat screens, the brightness of the total system must be considered.

In principle, a backlight unit (direct light system) has the structure described in the following. As a rule, it comprises a housing in which a varying number, depending on the size of the backlight unit, of fluorescent tubes, so-called CCFL (cold cathode fluorescent lamp), are arranged. The inside of the housing is equipped with a light-reflecting surface. The diffuser sheet, which has a thickness of 1 to 3 mm, preferably a thickness of 2 mm, lies on this illumination system. On the diffuser sheet is a set of films which can have the following functions: light scattering (diffuser films), circular polarizers, focusing of the light in the forwards direction by so-called BEF (brightness enhancing film) and linear polarizers. The linearly polarizing film lies directly under the LCD display on top.

Polycarbonate compositions in optical uses are conventionally always colour-corrected, i.e. they contain dyestuffs to adjust the colour locus in order to compensate for the slightly yellowish colour shade of the polycarbonate.

Dyestuffs which can be employed for adjustment of the colour locus in polycarbonate are in principle all dyestuffs which have a sufficiently high heat stability up to at least 300° C., so that they are not decomposed at the processing temperatures of the polycarbonate. Furthermore, the dyestuffs should not have basic functionalities, which lead to a degradation of the polymer chain of the polycarbonate.

These include dyestuffs of the following classes: anthanthrones, anthraquinones, benzimidazoles, diketopyrrolopyrroles, isoindolinols, perinones, perylenes, phthalocyanines, quinacridones and quinophthalones.

Thus e.g. MACROLEX® dyestuffs from Lanxess can be very suitably employed for colouring polycarbonate. A large number of various dyestuffs are available from this product line, e.g. the methine dyestuff MACROLEX® Yellow 6G Gran, the azo dyestuff MACROLEX® Yellow 4G, the pyrazolone dyestuff MACROLEX® Yellow 3G Gran, the quinophthalone dyestuff MACROLEX® Yellow G Gran, the perinone dyestuff MACROLEX® Orange 3G Gran, the methine dyestuff MACROLEX® Orange R Gran, the perinone dyestuffs MACROLEX® Red E2G Gran and MACROLEX® Red EG Gran and the anthraquinone dyestuffs MACROLEX® Red G Gran, MACROLEX® Red 5B Gran, MACROLEX® Red Violet R Gran, MACROLEX® Violet 3R Gran, MACROLEX® Violet B Gran, MACROLEX® Blue 3R Gran, MACROLEX® Blue RR Gran, MACROLEX® Blue 2B Gran, MACROLEX® Green 5B Gran and MACROLEX® Green G Gran.

WO 99/13007 moreover describes e.g. indigo derivatives which are suitable for dyeing polycarbonate.

DE 19747395 describes e.g. benzo(de)isoquinolinobenzo (1,2-d:4,5-d')diimidazole-2,12-diones which can be employed as polymer-soluble dyestuffs, inter alia in polycarbonate.

SUMMARY OF THE INVENTION

It has now been found, completely surprisingly, that if the dyestuffs always used in conventional diffuser sheets for colour correction of the polycarbonate are omitted, a drastic increase in the light transmission with a simultaneously high light scattering occurs. This effect manifests itself even more intensely in connection with the set of films typically used in a backlight unit (BLU).

In accordance with the present invention there is provided solid sheets produced from a polycarbonate composition which comprises transparent polymeric particles having a refractive index which differs from that of the polycarbonate, and is characterized by the absence of any of the colouring agents which are conventionally used for adjusting the colour of polycarbonate compositions.

In accordance with the present invention, there is also provided a solid sheet fabricated from a composition comprising:
(a) 80 to 99.99 wt. %, based on the total weight of said composition, of a transparent polycarbonate having a light transmission according to ISO 13 468-2 (at 4 mm thickness) of more than 88.5% and having a refractive index; and
(b) 0.01 to 20 wt. %, based on the total weight of said composition, of poly(meth)acrylate particles (also referred to herein as "polymeric particles"), said poly(meth)acrylate particles having,
  (i) a core/shell morphology,
  (ii) a particle size of from 0.5 and 100 μm, and
  (iii) a refractive index that is different that the refractive index of said transparent polycarbonate.

In accordance with the present invention, there is further provided a flat screen comprising a diffuser sheet, wherein said diffuser sheet comprises the solid sheet as described above. The backlighting apparatus of an LCD display may include such a diffuser sheet according to the present invention.

A further embodiment of the invention is a solid sheet fabricated from said composition, wherein said composition is free of a coloring agent selected from the group consisting of anthanthrones, anthraquinones, benzimidazoles, diketopyrrolopyrroles, isoindolinols, perinones, perylenes, phthalocyanines, quinacridones, quinophthalones and combinations thereof.

Other than in the operating examples, or where otherwise indicated, all numbers expressing quantities of ingredients, reaction conditions, and so forth used in the specification and claims are to be understood as modified in all instances by the term "about."

DETAILED DESCRIPTION OF THE INVENTION

The solid sheets according to the invention have a high light transmission with a simultaneously high light scattering and can be employed, for example, in the illumination systems of flat screens (LCD screens). A high light scattering with a simultaneously high light transmission is of decisive importance here. The illumination system of such flat screens can be achieved either with lateral light coupling (edgelight system) or, in the case of larger screen sizes where lateral light coupling is no longer adequate, via a backlight unit (BLU), in which the direct illumination behind the diffuser sheet must be distributed as uniformly as possible through this (direct light system).

Suitable polycarbonates for the production of the solid sheets according to the invention are all the known polycarbonates. These include homopolycarbonates, copolycarbonates and thermoplastic polyester carbonates.

The suitable polycarbonates preferably have average molecular weights ($\overline{M}_w$) of from 18,000 to 40,000, preferably from 26,000 to 36,000 and in particular from 28,000 to 35,000, determined by measurement of the relative solution viscosity in methylene chloride or in mixtures of equal amounts by weight of phenol/o-dichlorobenzene calibrated by light scattering.

For the preparation of polycarbonates, reference may be made by way of example to "Schnell, Chemistry and Physics of Polycarbonates, Polymer Reviews, vol. 9, Interscience Publishers, New York, London, Sydney 1964", and to "D. C. PREVORSEK, B. T. DEBONA and Y. KESTEN, Corporate Research Center, Allied Chemical Corporation, Moristown, N.J. 07960, 'Synthesis of Poly(ester)-carbonate Copolymers' in Journal of Polymer Science, Polymer Chemistry Edition, vol. 19, 75-90 (1980)", and to "D. Freitag, U. Grigo, P. R. Müller, N. Nouvertne, BAYER AG, 'Polycarbonates' in Encyclopedia of Polymer Science and Engineering, vol. 11, second edition, 1988, pages 648-718" and finally to "Dres. U. Grigo, K. Kircher and P. R. Müller 'Polycarbonate' in Becker/Braun, Kunststoff-Handbuch, volume 3/1, Polycarbonate, Polyacetale, Polyester, Celluloseester, Carl Hanser Verlag Munich, Vienna 1992, pages 117-299".

The preparation of the polycarbonates is preferably carried out by the phase interface process or the melt transesterification process and is described in the following by the phase interface process by way of example.

For the improvement of the optical properties of the described diffuser sheets it is necessary to use a polycarbonate base resin which have light transparency as high as possible. To obtain such a polycarbonate resin an optimized production process is needed. In WO 2004/063249 is a method described for the production of polycarbonates according to a system used in the two-phase interface method. In WO 01/05866 is melting transesterfication method for producing polycarbonates described. Both methods can be used to obtain the needed polycarbonate with high light transmission.

Compounds which are preferably to be employed as starting compounds are bisphenols of the general formula

HO-Z-OH wherein
Z is a divalent organic radical having 6 to 30 carbon atoms which contains one or more aromatic groups.

Examples of such compounds are bisphenols which belong to the group consisting of dihydroxydiphenyls, bis(hydroxyphenyl)alkanes, indanebisphenols, bis(hydroxyphenyl) ethers, bis(hydroxyphenyl) sulfones, bis(hydroxyphenyl) ketones and α,α'-bis(hydroxyphenyl)-diisopropylbenzenes.

Particularly preferred bisphenols which belong to the abovementioned groups of compounds are bisphenol A, tetraalkylbisphenol A, 4,4-(meta-phenylenediisopropyl)-diphenol (bisphenol M), 4,4-(para-phenylenediisopropyl)-diphenol, 1,1-bis-(4-hydroxyphenyl)-3,3,5-trimethylcyclohexane (bisphenol TMC) and mixtures thereof.

The bisphenol compounds to be employed according to the invention are preferably reacted with carbonic acid compounds, in particular phosgene, or, in the melt transesterification process, with diphenyl carbonate or dimethyl carbonate.

Polyester carbonates are preferably obtained by reaction of the bisphenols already mentioned, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenonedicarboxylic acids. A portion, up to 80 mol %, preferably from 20 to 50 mol % of the carbonate groups in the polycarbonates can be replaced by aromatic dicarboxylic acid ester groups.

Inert organic solvents used in the phase interface process are, for example, methylene chloride, the various dichloroethanes and chloropropane compounds, carbon tetrachloride, trichloromethane, chlorobenzene and chlorotoluene, and chlorobenzene or methylene chloride or mixtures of methylene chloride and chlorobenzene are preferably employed.

The phase interface reaction can be accelerated by catalysts, such as tertiary amines, in particular N-alkylpiperidines, or onium salts. Tributylamine, triethylamine and N-ethylpiperidine are preferably used. In the case of the melt transesterification process, the catalysts mentioned in DE-A 42 38 123 are preferably used.

The polycarbonates can be branched consciously and in a controlled manner by the use of small amounts of branching agents. Some suitable branching agents are: phloroglucinol, 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2, 4-dihydroxyphenyl)-propane; hexa-(4-(4-hydroxyphenyl-isopropyl)-phenyl) orthoterephthalate; tetra-(4-hydroxyphenyl)-methane; tetra-(4-(4-hydroxyphenyl-isopropyl)-phenoxy)-methane; α,α',α"-tris-(4-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)-benzene and, in particular: 1,1,1-tri-(4-hydroxyphenyl)-ethane and bis-(3-methyl-4-hydroxyphenyl)-2-oxo-2,3-dihydroindole.

The 0.05 to 2 mol%, based on the diphenols employed, of branching agents or mixtures of the branching agents optionally to be co-used can be employed together with the diphenols, but can also be added in a later stage of the synthesis.

Chain terminators which are preferably used are phenols, such as phenol, alkylphenols, such as cresol and 4-tert-butylphenol, chlorophenol, bromophenol, cumylphenol or mixtures thereof, in amounts of 1-20 mol %, preferably 2-10 mol % per mol of bisphenol. Phenol, 4-tert-butylphenol and cumylphenol are preferred.

Chain terminators and branching agents can be added to the syntheses separately or also together with the bisphenol.

The preparation of polycarbonates by the melt transesterification process is described by way of example in DE-A 42 38 123.

Polycarbonates which are preferred according to the invention are the homopolycarbonate based on bisphenol A, the homopolycarbonate based on 1,1-bis-(4-hydroxyphenyl)-3, 3,5-trimethylcyclohexane and the copolycarbonates based on the two monomers bisphenol A and 1,1-bis-(4-hydroxyphenyl)-3,3,5-trimethylcyclohexane and the copolycarbonates based on the two monomers bisphenol A and 4,4'-dihydroxydiphenyl (DOD).

The homopolycarbonate based on bisphenol A is particularly preferred. The polymeric particles based on acrylate having a core/shell morphology which are to be employed according to the invention are, for example and preferably, those such as are disclosed in EP-A 634 445.

The polymeric particles have a core of a rubber-like vinyl polymer. The rubber-like vinyl polymer can be a homo- or copolymer of any desired one of the monomers which have at least one ethylenically unsaturated group and which, as is known to the person skilled in the art in the field, undergo additional polymerization under the conditions of emulsion polymerization in an aqueous medium. Such monomers are listed in U.S. Pat. No. 4,226,752, column 3, lines 40-62, which disclosure is incorporated herein by reference.

The rubber-like vinyl polymer preferably comprises at least 15%, more preferably at least 25%, most preferably 40% of a polymerized acrylate, methacrylate, monovinylarene or optionally substituted butadiene and from 0 to 85%, more preferably from 0 to 75%, most preferably from 0 to 60% of one or more copolymerized vinyl monomers, based on the total weight of the rubber-like vinyl polymer.

Preferred acrylates and methacrylates are alkyl acrylates or alkyl methacrylates which preferably contain 1 to 18, particularly preferably 1 to 8, most preferably 2 to 8 carbon atoms in the alkyl group, such as methyl, ethyl, n-propyl, isopropyl, n-butyl, sec-butyl or tert-butyl or hexyl, heptyl or octyl groups. The alkyl group can be branched or linear. Preferred alkyl acrylates are ethyl acrylate, n-butyl acrylate, isobutyl acrylate or 2-ethylhexyl acrylate. The most preferred alkyl acrylate is butyl acrylate.

Other suitable acrylates include, for example, 1,6-hexanediol diacrylate, ethylthioethyl methacrylate, isobornyl acrylate, 2-hydroxyethyl acrylate, 2-phenoxyethyl acrylate, glycidyl acrylate, neopentylglycol diacrylate, 2-ethoxyethyl acrylate, t-butylaminoethyl methacrylate, 2-methoxyethyl acrylate, glycidyl methacrylate or benzyl methacrylate.

Preferred monovinylarenes include styrene or α-methylstyrene, optionally substituted on the aromatic ring by an alkyl group, such as methyl, ethyl or tertiary butyl, or by a halogen, such as chlorostyrene.

If substituted, the butadiene is preferably substituted by one or more alkyl groups which contain 1 to 6 carbon atoms, or by one or more halogens, most preferably by one or more methyl groups and/or one or more chlorine atoms. Preferred butadienes are 1,3-butadiene, isoprene, chlorobutadiene or 2,3-dimethyl-1,3-butadiene.

The rubber-like vinyl polymer may comprise one or more (co)polymerized acrylates, methacrylates, monovinylarenes and/or optionally substituted butadienes. These monomers can be copolymers with one or more other copolymerizable vinyl polymers, such as diacetone-acrylamide, vinylnaphthalene, 4-vinylbenzyl alcohol, vinyl benzoate, vinyl propionate, vinyl caproate, vinyl chloride, vinyl oleate, dimethyl maleate, maleic anhydride, dimethyl fumarate, vinylsulfonic acid, vinylsulfonamide, methyl vinylsulfonate, N-vinylpyrrolidone, vinylpyridine, divinylbenzene, vinyl acetate, vinyl versatate, acrylic acid, methacrylic acid, N-methylmethacrylamide, acrylonitrile, methacrylonitrile, acrylamide or N-(isobutoxymethyl)-acrylamide.

One or more of the abovementioned monomers are optionally reacted with 0 to 10%, preferably with 0 to 5% of a copolymerizable, polyfunctional crosslinking agent and/or with 0 to 10%, preferably with 0 to 5% of a copolymerizable polyfunctional grafting crosslinking agent, based on the total weight of the core. If a crosslinking monomer is used, it is preferably used with a content of from 0.05 to 5%, more preferably from 0.1 to 1%, based on the total weight of the core monomers. Crosslinking monomers are well-known in the technical field and in general they have a polyethylenic unsaturation in which the ethylenically unsaturated groups have approximately the same reactivity, such as divinylbenzene, trivinylbenzene, 1,3- or 1,4-triol acrylates or methacrylates or glycol di- or trimethacrylates or -acrylates, such as ethylene glycol dimethacrylate or diacrylate, propylene glycol dimethacrylate or diacrylate, 1,3- or 1,4-butylene glycol dimethacrylate or, most preferably, 1,3- or 1,4-butylene glycol diacrylate. If a grafting crosslinking monomer is used, it is preferably used with a content of from 0.1 to 5%, more preferably from 0.5 to 2.5%, based on the total weight of the core monomers. Grafting crosslinking monomers are well-known in the technical field, and in general they are polyethylenically unsaturated monomers which have a sufficiently low reactivity of the unsaturated groups, so that significant remaining unsaturation becomes possible, this remaining in the core after its polymerization. Preferred grafting crosslinking agents are polymerizable allyl, methallyl or crotyl esters of α,β-ethylenically unsaturated carboxylic acids or dicarboxylic acids, such as allyl methacrylate, allyl acrylate, diallyl maleate and allyl acryloxypropionate, most preferably allyl methacrylate.

The polymeric particles most preferably comprise a core of rubber-like alkyl acrylate polymers, wherein the alkyl group has from 2 to 8 carbon atoms, optionally copolymerized with from 0 to 5% of crosslinking agent and from 0 to 5% of grafting crosslinking agent, based on the total weight of the core. The rubber-like alkyl acrylate is preferably copolymerized with up to 50% of one or more copolymerizable vinyl monomers, for example those mentioned above. Suitable crosslinking and grafting crosslinking monomers are well-known to the person skilled in the art in the field, and they are preferably those such as are described in EP-A 0 269 324.

The core of the polymeric particles may contain residual oligomeric material which was employed in the polymerization process in order to swell the polymer particles, but such an oligomeric material has a sufficient molecular weight to prevent its diffusion or to prevent it from being extracted during processing or use.

The polymeric particles comprise one or more shells (also referred to herein as "jackets"). This one jacket or these several jackets are preferably prepared from a vinyl homo- or copolymer. Suitable monomers for the preparation of the jacket/jackets are listed in U.S. Pat. No. 4,226,752, column 4, lines 20-46, which disclosure is incorporated herein by reference. A jacket or several jackets are preferably a polymer of a methacrylate, acrylate, vinylarene, vinyl carboxylate, acrylic acid and/or methacrylic acid.

Preferred acrylates and methacrylates are alkyl acrylates or alkyl methacrylates, which preferably contain 1 to 18, more preferably 1 to 8, most preferably 2 to 8 carbon atoms in the alkyl group, such as methyl, ethyl, n-propyl, isopropyl, n-butyl, isobutyl or tert-butyl, 2-ethylhexyl or the hexyl, heptyl or octyl groups. The alkyl group can be branched or linear. The preferred alkyl acrylate is ethyl acrylate. Other acrylates and methacrylates which can be used are those which have been mentioned above for the core, preferably 3-hydroxypropyl methacrylate. The most preferred alkyl methacrylate is methyl methacrylate.

Preferred vinylarenes are styrene or α-methylstyrene, optionally substituted on the aromatic ring with an alkyl group, such as methyl, ethyl or tert-butyl, or with a halogen, such as chlorostyrene.

A preferred vinyl carboxylate is vinyl acetate.

The jacket/jackets preferably contains/contain at least 15%, more preferably at least 25%, most preferably at least 40% of a polymerized methacrylate, acrylate or monovinylarene and 0 to 85%, more preferably 0 to 75%, most preferably 0 to 60% of one or more vinyl comonomers, such as other alkyl methacrylates, aryl methacrylates, alkyl acrylates, aryl acrylates, alkyl- and arylacrylamides, acrylonitrile, methacrylonitrile, maleimide and/or alkyl and aryl acrylates and methacrylates, which are substituted by one or more substituents, such as halogen, alkoxy, alkylthio, cyanoalkyl or amino. Examples of suitable vinyl comonomers are given above. Two or more monomers can be copolymerized.

The jacket polymer may contain a crosslinking agent and/or a grafting crosslinking agent of the type such as has been mentioned above with reference to the core polymer.

The jacket polymers preferably make up from 5 to 40% more preferably from 15 to 35% of the total particle weight.

The polymeric particles comprise at least 15%, preferably from 20 to 80%, more preferably from 25 to 60%, most preferably from 30 to 50% of a polymerized alkyl acrylate or methacrylate, based on the total weight of the polymer. Preferred alkyl acrylates and methacrylates are mentioned above. The alkyl acrylate or alkyl methacrylate constituent can be present in the core and/or in the jacket/jackets of the polymeric particles. Homopolymers of an alkyl acrylate or methacrylate may be used in the core and/or the jacket/jackets, but an alkyl (meth)acrylate is preferably copolymerized with one or more other types of alkyl (meth)acrylates and/or one or more other vinyl polymers, preferably with those listed above. The polymeric particles most preferably comprise a core of a poly-(butyl acrylate) and a jacket or several jackets of poly(methyl methacrylate).

The polymeric particles are useful for conferring on the polycarbonate light-scattering properties. The refractive index n of the core and of the jacket/jackets of the polymeric particles (i.e., the refractive index n of the poly(meth)acrylate particles) is preferably within +/−0.25 units, more preferably within +/−0.18 units, most preferably within +/−0.12 units of the refractive index of the polycarbonate. The refractive index n of the core and of the jacket/jackets (i.e., the refractive index n of the poly(meth)acrylate particles) is preferably not closer than +/−0.003 units, more preferably not closer than +/−0.01 units, most preferably not closer than +/−0.05 units to the refractive index of the polycarbonate. The refractive index is measured in accordance with the standard ASTM D 542-50 and/or DIN 53 400.

The difference between the refractive index n of the poly (meth)acrylate particles (or polymeric particles) and the refractive index of the polycarbonate typically has an absolute value of from 0.003 to 0.25 units, more typically from 0.01 to 0.18 units, and still more typically from 0.05 to 0.12 units, inclusive of the recited units.

The polymeric particles in general have an average particle diameter of at least 0.5 micrometers, preferably of at least 2 micrometers, more preferably of from 2 to 50 micrometers, most preferably of from 2 to 15 micrometers. "Average particle diameter" is to be understood as meaning the number-average. Preferably, at least 90%, most preferably at least 95% of the polymeric particles have a diameter of more than 2 micrometers. The particle size is determined according to ISO 13 320-1. The polymeric particles are preferably a free-flowing powder.

The polymeric particles can be prepared in a known manner. In general, at least one monomer component of the core polymer is subjected to emulsion polymerization to form emulsion polymer particles. The emulsion polymer particles are swollen with the same or one or more other monomer components of the core polymer, and the monomer/monomers are polymerized within the emulsion polymer particles. The stages of swelling and polymerization can be repeated until the particles have grown to the desired core size. The core polymer particles are suspended in a second aqueous monomer emulsion, and a polymer jacket of the monomer/monomers is polymerized on to the polymer particles in the second emulsion. One jacket or several jackets can be polymerized on the core polymer. The preparation of core/jacket polymer particles is described in EP-A 0 269 324 and in the U.S. Pat. Nos. 3,793,402 and 3,808,180.

It is furthermore found, surprisingly, that brightness values of the solid sheets of the present invention may be increased further by using a small amount of optical brighteners.

Compounds of the following classes can be employed as optical brighteners:

a) Bis-benzoxazoles of the following structure:

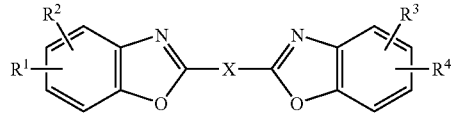

wherein $R^1$, $R^2$, $R^5$ and $R^6$ independently of one another represent H, alkyl, aryl, heteroaryl or halogen and X can represent the following groups:

stilbene:

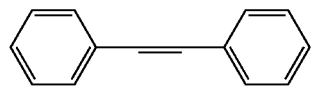

thiophene:

naphthalene:

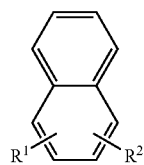

where $R^1$ and $R^1$ independently of one another represent H, alkyl, aryl heteroaryl or halogen.

For example Uvitex® OB from Ciba Spezialitätenchemie of the formula

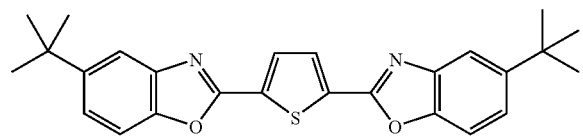

or Hostalux KCB from Clariant GmbH of the formula

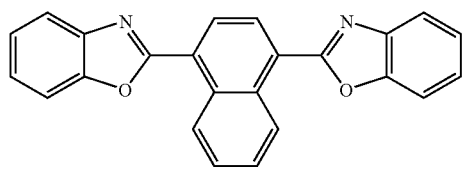

b) Phenylcoumarins of the following structure:

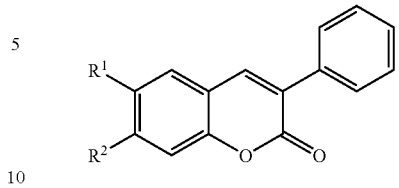

wherein $R^1$ and $R^2$ independently of one another can represent H, alkyl, aryl, heteroaryl or halogen.

For example Leukopur® EGM from Clariant GmbH of the formula:

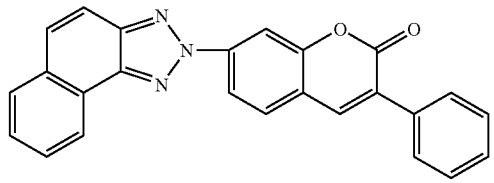

c) Bis-styryl-biphenyls of the following structure:

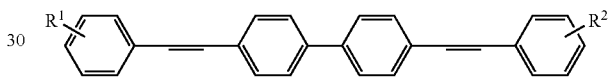

wherein $R^1$ and $R^2$ independently of one another can represent H, alkyl, aryl, heteroaryl or halogen.

A preferred embodiment of the invention is therefore a solid sheet according to the invention which additionally contains 0.001 to 0.2 wt. %, preferably about 1,000 ppm of an optical brightener of the bis-benzoxazole, phenylcoumarin or bis-styrylbiphenyl class.

A particularly preferred optical brightener is Uvitex OB from Ciba Spezialitätenchemie.

The solid sheets according to the invention can be produced either by injection moulding or by extrusion. If they are large-area solid sheets here, production cannot be carried out economically by injection moulding for technical reasons. In these cases, the extrusion process is to be preferred. For the extrusion, polycarbonate granules are fed to the extruder and melted in the plasticizing system of the extruder. The melt of plastic is forced through a slot die and thereby formed, brought into the desired final form in the nip of a polishing calender and fixed in form by alternate cooling on the polishing stack and in the ambient air. The polycarbonates of high melt viscosity used for the extrusion are conventionally processed at melt temperatures of from 260 to 320° C., and the cylinder temperatures of the plasticizing cylinder and the die temperatures are set accordingly.

By employing one or more subsidiary extruders and suitable melt adapters before the slot die, polycarbonate melts of different composition can be laid on one another and multi-layered solid sheets can thus be produced (see, for example, EP-A 0 110 221 and EP-A 0 110 238).

Both the base layer and the optionally present coextruded layer(s) of the shaped articles according to the invention can additionally contain additives, such as, for example, UV absorbers and other conventional processing auxiliaries, in particular mould release agents and flow agents as well as the conventional stabilizers, in particular heat stabilizers, as well as antistatics and optical brighteners for polycarbonates. Different additives or concentrations of additives can be present in each layer here.

In a preferred embodiment, the composition of the solid sheet additionally comprises 0.01 to 0.5% by weight of a UV absorber from the classes of benzotriazole derivatives, dimeric benzotriazole derivatives, triazine derivatives, dimeric triazine derivatives and diaryl cyanoacrylates.

In particular, the coextruded layer can contain UV absorbers and mould release agents.

The UV protection layer preferably comprises at least one coextruded layer with at least one UV absorber in an amount of from 0.1 to 20% by weight, based on the coextruded layer.

Suitable stabilizers are, for example, phosphines, phosphites or Si-containing stabilizers and further compounds described in EP-A 0 500 496. There may be mentioned by way of example triphenyl phosphites, diphenyl alkyl phosphites, phenyl dialkyl phosphites, tris-(nonylphenyl) phosphite, tetrakis-(2,4-di-tert-butylphenyl) 4,4'-biphenylenediphosphonite, bis-(2,4-dicumylphenyl)-pentaerythritol diphosphite and triaryl phosphite. Triphenylphosphine and tris-(2,4-di-tert-butylphenyl) phosphite are particularly preferred.

Suitable mould release agents are, for example, the esters or partial esters of mono- to hexahydric alcohols, in particular of glycerol, of pentaerythritol or of Guerbet alcohols.

Monohydric alcohols are, for example, stearyl alcohol, palmityl alcohol and Guerbet alcohols, a dihydric alcohol is, for example, glycol, a trihydric alcohol is, for example, glycerol, tetrahydric alcohols are, for example, pentaerythritol and mesoerythritol, pentahydric alcohols are, for example, arabitol, ribitol and xylitol, and hexahydric alcohols are, for example, mannitol, glucitol (sorbitol) and dulcitol.

The esters are preferably the monoesters, diesters, triesters, tetraesters, pentaesters and hexaesters or mixtures thereof, in particular statistical mixtures, of saturated aliphatic $C_{10}$ to $C_{36}$-monocarboxylic acids and optionally hydroxy-monocarboxylic acids, preferably with saturated aliphatic $C_{14}$ to $C_{32}$-monocarboxylic acids and optionally hydroxy-monocarboxylic acids.

The commercially obtainable fatty acid esters, in particular of erythritol and of glycerol, can contain <60% of different partial esters due to their preparation.

Saturated aliphatic monocarboxylic acids having 10 to 36 C atoms are, for example, capric acid, lauric acid, myristic acid, palmitic acid, stearic acid, hydroxystearic acid, arachic acid, behenic acid, lignoceric acid, cerotic acid and montan acids.

Preferred saturated aliphatic monocarboxylic acids having 14 to 22 C atoms are, for example, myristic acid, palmitic acid, stearic acid, hydroxystearic acid, arachic acid and behenic acid.

Saturated aliphatic monocarboxylic acids such as palmitic acid, stearic acid and hydroxystearic acid are particularly preferred.

The saturated aliphatic $C_{10}$ to $C_{36}$-carboxylic acids and the fatty acid esters are either known as such from the literature or can be prepared by processes known from the literature. Examples of pentaerythritol fatty acid esters are those of the particularly preferred abovementioned monocarboxylic acids.

Esters of pentaerythritol and of glycerol with stearic acid and palmitic acid are particularly preferred.

Esters of Guerbet alcohols and of glycerol with stearic acid and palmitic acid and optionally hydroxystearic acid are also particularly preferred.

Examples of suitable antistatics are cationic compounds, for example quaternary ammonium, phosphonium or sulfonium salts, anionic compounds, for example alkylsulfonates, alkyl sulfates, alkyl phosphates and carboxylates in the form of alkali metal or alkaline earth metal salts, and nonionic compounds, for example polyethylene glycol esters, polyethylene glycol ethers, fatty acid esters and ethoxylated fatty amines. Preferred antistatics are nonionic compounds.

Suitable UV absorbers are, for example, a) Benzotriazole derivatives according to formula (I):

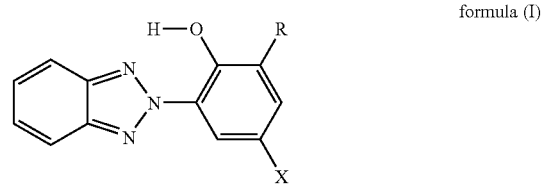

formula (I)

In formula (I), R and X are identical or different a denote H or alkyl or alkylaryl.

Preferred compounds here are Tinuvin 329, where X=1,1,3,3-tetramethylbutyl and R=H Tinuvin 350, where X=tert-butyl and R=2-butyl and Tinuvin 234, where X=R=1,1-dimethyl-1-phenyl.

b) Dimeric benzotriazole derivatives according to formula (II):

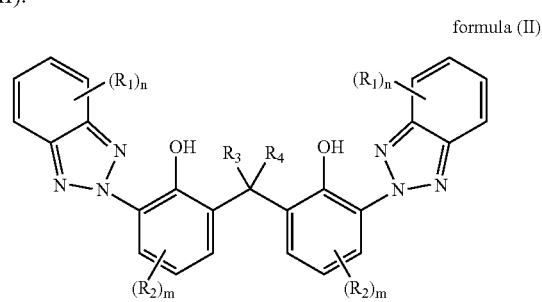

formula (II)

In formula (II), $R^1$ and $R^2$ are identical or different and denote H, halogen, $C_1$-$C_{10}$-alkyl, $C_5$-$C_{10}$-cycloalkyl, $C_7$-$C_{13}$-aralkyl, $C_6$-$C_{14}$-aryl, —$OR^5$ or —(CO)—O—$R^5$, where $R^5$=H or $C_1$-$C_4$-alkyl.

In formula (II), $R^3$ and $R^4$ are likewise identical or different and denote H, $C_1$-$C_4$-alkyl, $C_5$-$C_6$-cycloalkyl, benzyl or $C_6$-$C_{14}$-aryl.

In formula (II), m denotes 1, 2 or 3 and n denotes 1, 2, 3 or 4.

A preferred compound here is Tinuvin 360, where $R^1$=$R^3$=$R^4$=H; n=4; $R^2$=1,1,3,3-tetramethylbutyl; m=1.

b1) Dimeric benzotriazole derivatives according to formula (III):

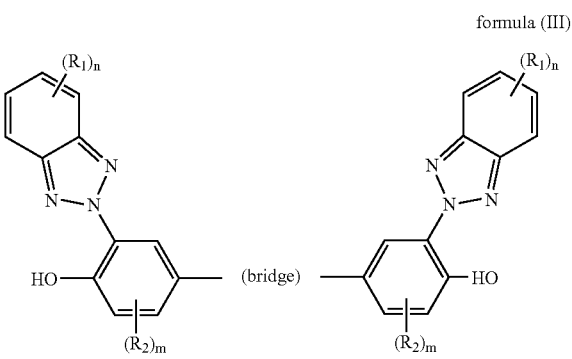

formula (III)

wherein the bridge denotes

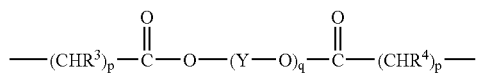

$R^1$, $R^2$, m and n have the meaning given for formula (II),
and wherein p is an integer from 0 to 3,
q is an integer from 1 to 10,
Y is —CH$_2$—CH$_2$—, —(CH$_2$)$_3$—, —(CH$_2$)$_4$—, —(CH$_2$)$_5$—, —(CH$_2$)$_6$— or —CH(CH$_3$)—CH$_2$— and
$R^3$ and $R^4$ have the meaning given for formula (II).

A preferred compound here is Tinuvin 840, where $R^1$=H; n=4; $R^2$=tert-butyl; m=1; $R^2$ is located in the ortho-position relative to the OH group; $R^3$=$R^4$=H; p=2; Y=—(CH$_2$)$_5$—; q=1.

c) Triazine derivatives according to formula (IV):

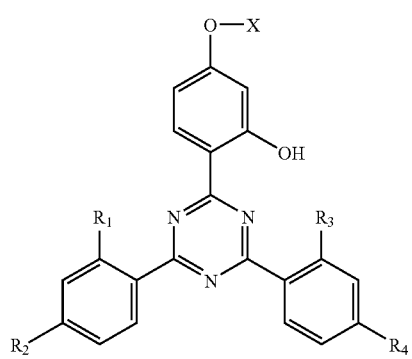

formula (IV)

wherein $R^1$, $R^2$, $R^3$ and $R^4$ in formula (IV) are identical or different and are H or alkyl or CN or halogen and X is alkyl.

Preferred compounds here are Tinuvin 1577, where $R^1$⊚$R^2$=$R^3$=$R^4$=H; X=hexyl and Cyasorb UV-1164, where $R^1$=$R^2$502 $R^3$=$R^4$=methyl; X=octyl d) Triazine derivatives of the following formula (IVa)

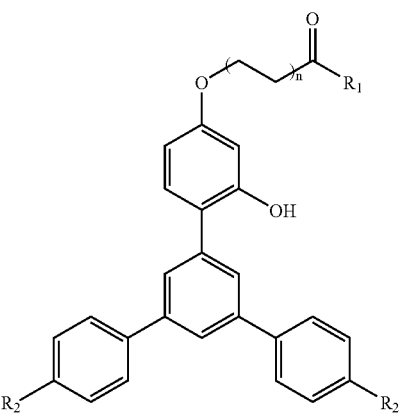

formula (IVa)

wherein
$R^1$ denotes $C_1$-alkyl to $C_{17}$-alkyl,
$R^2$ denotes H or $C_1$-alkyl to $C_4$-alkyl and
n is 0 to 20.

e) Dimeric triazine derivatives of the formula (V):

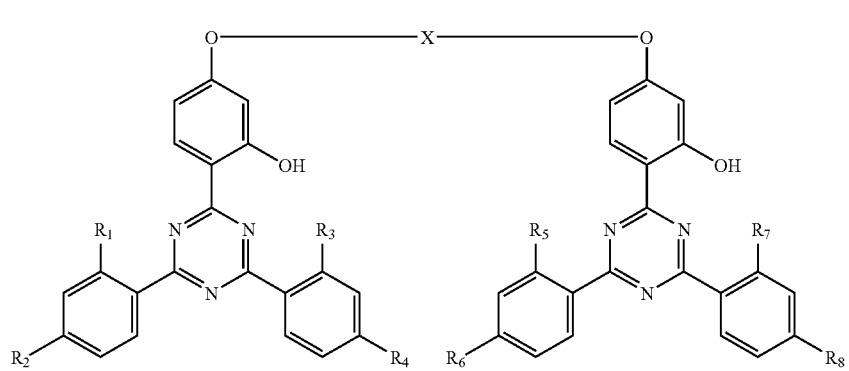

formula (V)

wherein

R$^1$, R$^2$, R$^3$, R$^4$, R$^5$, R$^6$, R$^7$ and R$^8$ in formula (V) can be identical or different and denote H or alkyl or CN or halogen and X is alkyl or —(CH$_2$CH$_2$—O)$_n$—C(=O).

f) Diarylcyanoacrylates of the formula (VI):

formula (VI)

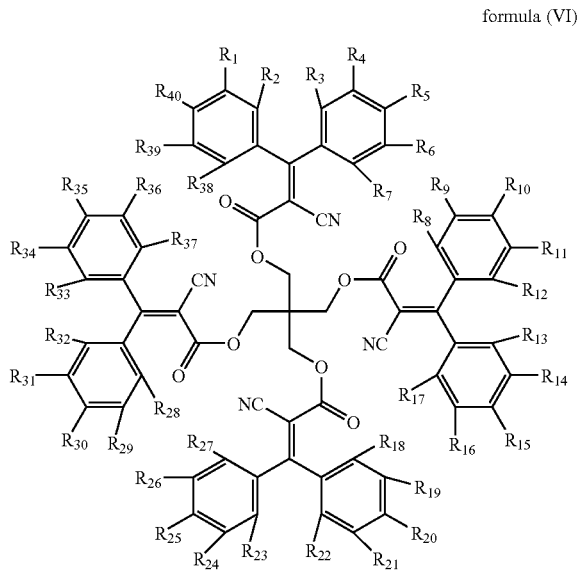

wherein R$^1$ to R$^{40}$ can be identical or different and denote H, alkyl, CN or halogen.

A preferred compound here is Uvinul 3030, where R$^1$ to R$^{40}$=H

The abovementioned UV absorbers are known to the person skilled in the art and in some cases are commercially obtainable.

The following examples are intended to illustrate the invention, but without limiting it.

EXAMPLES

The 2 mm solid sheets listed in Examples 1 to 11 were produced as follows:
1. Preparation of the compound with conventional twin-screw compounding extruders (e.g. ZSK 32) at conventional processing temperatures for polycarbonate of from 250 to 330° C.
2. The machines and apparatuses used to produce the optionally coextruded 2 mm solid sheets comprise:
   the main extruder with a screw of length 33 D and a diameter of 70 mm with devolatilization;
   a coextruder for application of the top layer with a screw of length 25 D and a diameter of 35 mm;
   a special coextrusion slot die of 450 mm width;
   a polishing calendar;
   a roller conveyor;
   a take-off device;
   a device for cutting into lengths (saw); and
   a stacking table.

The polycarbonate granules of the base material were fed to the feed hopper of the main extruder. In Example 11, Makrolon® DP1-1816 MAS055 550054 polycarbonate, commercially available from Bayer MaterialScience AG was fed as a coextrusion material to that of the coextruder. The melting and conveying of the particular material took place in the particular cylinder/screw plasticizing system. The two material melts were brought together in the coextrusion die and, after leaving the die and cooling in the calender, formed a composite. Further devices served for transportation, cutting to length and stacking of the extruded sheets.

Example 1

The following composition was used to prepare a solid sheet.
Makrolong® 3100 550115, a bisphenol A based polycarbonate, having a Ty of 88.3 (measured according to ISO 13 468-2 at 4 mm thickness), commercially available from Bayer MaterialScience AG with a content of 98.8 wt. %; and
Core/shell particles with a butadiene/styrene core and a methyl methacrylate shell of Paraloid EXL 5137 commercially available from Rohm & Haas with a particle size of from 2 to 15 µm and an average particle size of 8 µm with a content of 1.2 wt. %.

A 2 mm solid sheet was extruded from this composition without a coextruded layer.

Example 2

The following composition was used to prepare a solid sheet.
Makrolon® 3100 550115 polycarbonate, commercially available from Bayer MaterialScience AG with a content of 98.4 wt. %; and
Core/shell particles with a butadiene/styrene core and a methyl methacrylate shell of Paraloid EXL 5137 commercially available from Rohm & Haas with a particle size of from 2 to 15 µm and an average particle size of 8 µm with a content of 1.6 wt. %.

A 2 mm solid sheet was extruded from this composition without a coextruded layer.

Example 3

The following composition was used to prepare a solid sheet.
Makrolon® 3100 550115 polycarbonate, commercially available from Bayer MaterialScience AG with a content of 98.0 wt. %; and
Core/shell particles with a butadiene/styrene core and a methyl methacrylate shell of Paraloid EXL 5137 commercially available from Rohm & Haas with a particle size of from 2 to 15 µm and an average particle size of 8 µm with a content of 2.0 wt. %.

A 2 mm solid sheet was extruded from this composition without a coextruded layer.

Example 4

The following composition was used to prepare a solid sheet.
Makrolon® 3100 550115 polycarbonate, commercially available from Bayer MaterialScience AG with a content of 97.6 wt. %; and
Core/shell particles with a butadiene/styrene core and a methyl methacrylate shell of Paraloid EXL 5137, commercially available from Rohm & Haas with a particle size of from 2 to 15 µm and an average particle size of 8 µm with a content of 2.4 wt. %.

A 2 mm solid sheet was extruded from this composition without a coextruded layer.

Example 5

The following composition was used to prepare a solid sheet.
Makrolon® 3100 000000, a bisphenol A based polycarbonate, having a Ty of 89.6 (measured according to ISO 13 468-2 at 4 mm thickness), commercially available from Bayer MaterialScience AG with a content of 98.8 wt. %; and Core/shell particles with a butadiene/styrene core and a methyl methacrylate shell of Paraloid EXL 5137 from Rohm & Haas with a particle size of from 2 to 15 μm and an average particle size of 8 μm with a content of 1.2 wt. %.

A 2 mm solid sheet was extruded from this composition without a coextruded layer.

Example 6

The following composition was used to prepare a solid sheet.
Makrolon® 3100 000000 polycarbonate, commercially available from Bayer MaterialScience AG with a content of 98.4 wt. %; and
Core/shell particles with a butadiene/styrene core and a methyl methacrylate shell of Paraloid EXL 5137, commercially available from Rohm & Haas with a particle size of from 2 to 15 μm and an average particle size of 8 μm with a content of 1.6 wt. %.

A 2 mm solid sheet was extruded from this composition without a coextruded layer.

Example 7

The following composition was used to prepare a solid sheet.
Makrolon® 3100 000000 polycarbonate, commercially available from Bayer MaterialScience AG with a content of 98.0 wt. %; and
Core/shell particles with a butadiene/styrene core and a methyl methacrylate shell of Paraloid EXL 5137, commercially available from Rohm & Haas with a particle size of from 2 to 15 μm and an average particle size of 8 μm with a content of 2.0 wt. %.

A 2 mm solid sheet was extruded from this composition without a coextruded layer.

Example 8

The following composition was used to prepare a solid sheet.
Makrolon® 3100 000000 polycarbonate, commercially available from Bayer MaterialScience AG with a content of 97.6 wt. %; and
Core/shell particles with a butadiene/styrene core and a methyl methacrylate shell of Paraloid EXL 5137, commercially available from Rohm & Haas with a particle size of from 2 to 15 μm and an average particle size of 8 μm with a content of 2.4 wt. %.

A 2 mm solid sheet was extruded from this composition without a coextruded layer.

Example 9

The following composition was used to prepare a solid sheet.
Makrolon® 3100 000000 polycarbonate, commercially available from Bayer MaterialScience AG with a content of 97.5 wt. %;
Core/shell particles with a butadiene/styrene core and a methyl methacrylate shell of Paraloid EXL 5137, commercially available from Rohm & Haas with a particle size of from 2 to 15 μm and an average particle size of 8 μm with a content of 2.4 wt. %; and
Optical brightener Uvitex® OB, commercially available from Ciba Spezialitätenchemie in an amount of 0.1 wt. %

A 2 mm solid sheet was extruded from this composition without a coextruded layer.

Example 10

The following composition was used to prepare a solid sheet.
Makrolon® 3100 000000 polycarbonate, commercially available from Bayer MaterialScience AG with a content of 97.6 wt. %; and
Core/shell particles with a butadiene/styrene core and a methyl methacrylate shell of Paraloid EXL 5137, commercially available from Rohm & Haas with a particle size of from 2 to 15 μm and an average particle size of 8 μm with a content of 2.4 wt. %.

A 2 mm solid sheet was extruded from this composition with Makrolon® DP1-1816 MAS055 550054 polycarbonate, commercially available from Bayer MaterialScience AG as a coextruded layer.

Example 11

The following composition was used to prepare a solid sheet.
Makrolon® 3100 000000 polycarbonate, commercially available from Bayer MaterialScience AG with a content of 97.5 wt. %;
Core/shell particles with a butadiene/styrene core and a methyl methacrylate shell of Paraloid EXL 5137, commercially available from Rohm & Haas with a particle size of from 2 to 15 μm and an average particle size of 8 μm with a content of 2.4 wt. %; and
Optical brightener Uvitex® OB from Ciba Spezialitätenchemie in an amount of 0.1 wt. %.

A 2 mm solid sheet was extruded from this composition with Makrolon® DP1-1816 MAS055 550054 polycarbonate, commercially available from Bayer MaterialScience AG as a coextruded layer.

The 2 mm solid sheets listed in Examples 1 to 11 were evaluated for their optical properties in accordance with the following standards and using the following measuring equipment.

For determination of the light transmission (Ty (C2°)), an Ultra Scan XE from Hunter Associates Laboratory, Inc. was used. The measurements for determination of the yellow value (Yellowness Index YI (D65, C2°), ASTM E313), the x, y colour values (D65, C2°, CIE standard colour table) and the L, a, b colour values (D65, C2°, CIELAB colour system, DIN 6174) were moreover carried out with this apparatus. A Lambda 900 from Perkin Elmer Optoelectronics was used for the light reflection (Ry (C2°)). A Hazegard Plus from Byk-Gardner was used for the haze determination (in accordance with ASTM D 1003). The half-width angle HW was determined with goniophotometer in accordance with DIN 58161 as a measure of the intensity of the light-scattering action. The luminous density measurements (brightness measurements) were carried out on a backlight unit (BLU) from CHI MEI OPTOELECTRONICS, LCD type: V270W1-L01 (27" LCD TV panel), used in the apparatus type: TL2701FM from TECO Electric & Machinery Co., Ltd., Taiwan) with the aid of an LS100 luminance meter from Minolta.

The optical data of 2 mm solid sheets (Examples 1 to 11) are shown in Table 1. The particular sheets of colour-corrected Makrolon® 3100 polycarbonate with the colour code 550115 are produced in Examples 1 to 4. The designation Makrolon® 3100 polycarbonate here stands for a linear polycarbonate based on bisphenol A of molecular weight 31000 to 32000 g/mol which is not UV-stabilized. The colour code 550115 corresponds to the colour locus of a commercially obtainable Makrolon® 3103 550115 polycarbonate.

TABLE 1

Optical data of the 2 mm solid sheets

|  | Example 1<br>3100 550115 + 1.2%<br>Paraloid + colour<br>corrector | Example 2<br>3100 550115 + 1.6%<br>Paraloid + colour<br>corrector | Example 3<br>3100 550115 + 2.0%<br>Paraloid + colour<br>corrector | Example 4<br>3100 550115 + 2.4%<br>Paraloid + colour<br>corrector |
|---|---|---|---|---|
| Ty[%](C2°) Hunter Ultra Scan | 58.2 | 57.5 | 54 | 51.8 |
| Ry[%](C2°) PE Lambda 900 | 27.1 | 27.6 | 31.5 | 33.7 |
| Ty Hunter + Ry Lambda | 85.3 | 85.1 | 85.5 | 85.5 |
| HW[°] | 54 | 54 | 55 | 56 |
| YI(C2°) | 5.0 | 4.8 | 2.7 | 0.8 |
| L*(C2°) | 76.16 | 75.75 | 73.70 | 72.34 |
| a*(C2°) | 0.46 | 0.47 | 0.54 | 0.64 |
| b*(C2°) | 1.94 | 1.83 | 0.88 | 0.06 |
| Haze [%] | 100 | 100 | 100 | 100 |
| Brightness [cd/m2] without films | 5,400 |  | 5,000 | 4,900 |
| Brightness [cd/m2] with films | 4,250.00 |  | 3,900.00 | 3,850.00 |
|  | Example 5<br>3100 000000 + 1.2%<br>Paraloid | Example 6<br>3100 000000 + 1.6%<br>Paraloid | Example 7<br>3100 000000 + 2.0%<br>Paraloid | Example 8<br>3100 000000 + 2.4%<br>Paraloid |
| Ty[%](C2°) Hunter Ultra Scan | 60.9 | 57.8 | 55.9 | 53.8 |
| Ry[%](C2°) PE Lambda 900 | 29.6 | 35.1 | 38.6 | 42.0 |
| Ty Hunter + Ry Lambda | 90.5 | 92.9 | 94.5 | 95.8 |
| HW[°] | 58 | 56 | 57 | 58 |
| YI(C2°) | 8.2 | 7.1 | 6.4 | 6.5 |
| L*(C2°) | 78.06 | 75.79 | 74.39 | 73.2 |
| a*(C2°) | −0.22 | −0.28 | −0.03 | −0.42 |
| b*(C2°) | 3.70 | 3.16 | 2.80 | 2.86 |
| Haze [%] | 100 | 100 | 100 | 100 |
| Brightness [cd/m2] without films | 6,350 | 6,150 | 6,150 | 6,050 |
| Brightness [cd/m2] with films | 6,550 | 6,550 | 6,600 | 6,550 |
|  | Example 9<br>3100 000000 + 2.4%<br>Paraloid + 1,000 ppm<br>optical brightener | Example 10<br>3100 000000 + 2.4%<br>Paraloid | Example 11<br>3100 000000 + 2.4%<br>Paraloid + 1,000 ppm<br>optical brightener | Example 12 |
| Ty[%](C2°) Hunter Ultra Scan | 56.4 | 56.6 | 54.6 |  |
| Ry[%](C2°) PE Lambda 900 | 42.2 | 36.7 | 41.9 |  |
| Ty Hunter + Ry Lambda | 98.6 | 93.3 | 96.5 |  |
| HW[°] | 59 | 56 | 60 |  |
| YI(C2°) | 8.2 | 6.8 | 8.1 |  |
| L*(C2°) | 73.38 | 74.07 | 71.68 |  |
| a*(C2°) | −0.95 | −0.43 | −0.93 |  |
| b*(C2°) | 3.82 | 3.03 | 3.72 |  |
| Haze [%] | 100 | 100 | 100 |  |
| Brightness [cd/m2] without films | 6,300 | 6,050 | 6,050 |  |
| Brightness [cd/m2] with films | 6,800 | 6,550 | 6,550 |  |

It can first be seen in Table 1 that as the content of the scattering pigment Paraloid increases, the light transmission measured decreases, while the light reflection measured increases. This applies both to the example series of Example 1 to 4 and to Examples 5 to 8. In the case of the colour-corrected Examples 1 to 4, the total of the light transmission and light reflection is constant at approx. 85%. In the case of Examples 5 to 8, which are not colour-corrected, however, the total in the range of scattering pigment content investigated increases as the scattering pigment content increases.

The brightness investigated is striking in the comparison. The procedure for measurement of this parameter was as follows. From the sheets of Examples 1 to 10 considered, pieces which fit were sawn out and incorporated into a backlight unit (BLU): CHI MEI OPTOELECTRONICS, LCD type: V270W1-L01 (27" LCD TV panel), used in the following apparatus type: TL2701FM from TECO Electric & Machinery Co., Ltd., Taiwan). The brightness was then investigated with and without the set of films used in this backlight unit. The brightness was measured here at a total of 9 different places on the backlight unit (with the aid of a Minolta LS100 luminance meter) and the mean of these was calculated.

It can be seen in Examples 1 to 4 that without a film package the brightness decreases as the scattering pigment content increases. This decrease approximately corresponds to the decrease in transmission: Example 1: brightness 5,400 cd/m$^2$ (100%), transmission 58.2% (100%) and Example 4: brightness 4,900 cd/m$^2$ (approx. 90% of Example 1), transmission 51.8% (approx. 90% of Example 1).

With the film package, the brightness in Examples 1 to 4 is approx. 20% lower and the path is the same: Example 1: brightness 4,250 cd/m$^2$ (100%) and Example 4: brightness 3,850 cd/m$^2$ (approx. 90% of Example 1).

The course in Examples 5 to 8 appears different. Here, the light transmission decreases similarly to that in Examples 1 to 4 from 100% in Example 5 to approx. 90% in Example 8, while the decrease in the brightness without films from 100% for Example 5 to 95% in Example 8 is surprisingly low, and if the set of films is used is even not to be observed at all. Moreover, surprisingly, the brightness when using the set of films in Examples 5 to 8 is even higher by up to 8% compared with Examples 1 to 4 (Example 8).

It is furthermore found, surprisingly, that the brightness values can be increased further by the use of a small amount (1,000 ppm) of optical brightener (Uvitex OB from Ciba Spezialitätenchemie). This is very surprising, in particular since the emission spectrum of the light source (CCFL) used in the backlight unit has no noticeable light emission below 400 nm. However, the optical brightener used in Examples 9 and 11 is no longer excited at wavelengths above 420 nm. Therefore only the wavelength range between 400 and 420 nm can be responsible for excitation of the optical brightener. The absorption of the light emitted by the lamps in the wavelength range of from 400 to 420 nm by the optical brightener has the effect of a surprisingly high increase in luminous density (brightness with the set of films) of approx. 4% (Example 9) compared with the comparison example without an optical brightener (Example 8).

In Examples 10 and 11, there is a UV-absorbing coextruded layer approx. 50 µm thick on the sheets investigated. This UV coextruded layer is made of Makrolon® 3100 and contains a dimeric benzotriazole derivative (Tinuvin® 360 from Ciba) as a UV absorber, which ensures that wavelengths below from 410 to 420 nm are absorbed completely. For this reason, the optical brightener in Example 11 no longer shows the action described above and the luminous density measurements on Example 10, which carries the same coextruded layer as Example 11 but which contains no optical brightener, shows the same luminous density values as Example 11.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flat screen comprising a diffuser sheet, wherein said diffuser sheet comprises the solid sheet comprises a composition comprising:
    (a) 80 to 99.99 wt. %, based on the total weight of said composition, of a transparent polycarbonate having a light transmission according to ISO 13 468-2 (at 4 mm thickness) of more than 88.5% and having a refractive index; and
    (b) 0.01 to 20 wt. %, based on the total weight of said composition, of poly(meth)acrylate particles, said poly (meth)acrylate particles having,
        (i) a core/shell morphology,
        (ii) a particle size of from 1 and 100 µm, and
        (iii) a refractive index that is different that the refractive index of said transparent polycarbonate,
wherein said composition is free of a coloring agent selected from the group consisting of anthanthrones, anthraquinones, benzimidazoles, diketopyrrolopyrroles, isoindolinols, perinones, perylenes, phthalocyanines, quinacridones, quinophthalones and combinations thereof.

2. The flat screen of claim 1 wherein said composition further comprises 0.001 to 0.2 wt. % of an optical brightener selected from the group consisting of bis-beuzoxazoles, phenylcoumarmns, bis-styrylbiphenyls and combinations thereof.

3. The flat screen of claim 1 wherein said composition further comprises 0.01 to 0.5 wt. % of a UV absorber selected from the group consisting of benzotriazole derivative, dimeric benzotriazole derivative, triazine derivative, dimeric triazine derivative, diaryl cyanoarylate and combinations thereof.

4. The flat screen of claim 1 wherein the solid sheet has a thickness of from 1 mm to 3 mm.

5. The flat screen of claim 1 wherein the difference between the refractive index n of the polycarbonate and refractive index n of the poly(meth)acrytate particles has an absolute value of from 0.003 to 0.25 units.

6. The flat screen of claim 1 wherein the solid sheet has at least one surface, and said solid sheet further comprises a UV protection layer on at least one surface.

7. The flat screen of claim 5 wherein the UV protection layer comprises a lacquer comprising a UV absorber.

8. The flat screen of claim 5 wherein the UV protection layer comprises at least one coextruded layer comprising at least one UV absorber in an amount of from 0.1 to 20 wt. %, based on the weight of the coextruded layer.

* * * * *